Thin layer chromatography of the product

Thin Layer chromatography of the product

United States Patent Office 3,819,718
Patented June 25, 1974

3,819,718
PROCESS FOR THE CONTINUOUS PREPARATION
OF THIOETHER
Osamu Okumura, Funabashi, Takenobu Sakatani, Chiba,
and Masuzo Nagayama, Tokyo, Japan, assignors to
Lion Fat and Oil Company, Limited, Tokyo, Japan
Filed June 9, 1972, Ser. No. 261,429
Claims priority, application Japan, June 10, 1971,
46/41,347
Int. Cl. C07c 149/18
U.S. Cl. 260—609 B                 4 Claims

ABSTRACT OF THE DISCLOSURE

Multiple tank-stirred-flow-reactors connected in series, which allow control of specific reaction conditions, are used in a continuous preparation of a thioether by reacting an α-olefin having 8–20 carbon atoms with a mercapto compound having the formula:

RSH wherein R represents mono-, di- or tri-hydroxyalkyl groups having 2–5 carbon atoms in the presence of air as a radical initiator.

BACKKGROUND OF THE INVENTION

Field Of The Invention

This invention relates to a process using several tank-stirred-flow-reactors connected in series for the continuous preparation of thioethers by reacting an α-olefin with a mercapto compound in the presence of air as a free radical initiator.

Description Of The Prior Art

It has been recognized that in the preparation of thioethers by reacting an α-olefin, having 4–16 carbon atoms with a mercapto compound, in the presence of air or oxygen, as a radical initiator, an undesirable induction period for the reaction and/or a severe exothermic reaction can result. It is known that these undesirable conditions can be controlled by adding up to 50% of the reaction solution to the starting materials in a batch system or by recycling up to 99% of the reaction solution in a continuous system. Suitable reaction temperatures have been in the range of −50∼100° C., preferably 0°–50° C., and the amount of oxygen has been in the range of 0.01–10 litre per 1 kg. of the reacted olefin. The reaction pressure has been in the range of 0.5–10 atm. (British Pat. No. 1,174,158). As a consequence, serious disadvantages have accrued in that a large reactor is required, a large amount of by-product is produced at the reaction temperatures used because of the difficulty in controlling the temperature of the reactor, and the reaction rate is too slow in said range of air injection. Accordingly, a larger size reactor has been required.

Ultraviolet radiation and compounds such as benzoyl peroxide and azobisisobutyronitrile are well known initiators for free radical reactions. In reactions catalyzed by ultraviolet radiation, the operational and apparatus costs are quite high and difficulty is encountered in operating a continuous reaction in industrial production. In reactions catalyzed by radical initiators such as benzoyl peroxide and azobisisobutyronitrile, a severe exothermic reaction follows the induction period of the reaction. In addition to the disadvantages encountered in the dangerous operation of an exothermic reaction, difficulty is encountered in separating the catalyst from solution which decreases product quality and increases purification costs.

It is also well known to the art that thioethers can be prepared by reacting an alkyl halide with a mercapto compound in the presence of an alkali at high temperatures in an ionic reaction (German Pat. No. 1,568,215). The reaction is illustrated as follows:

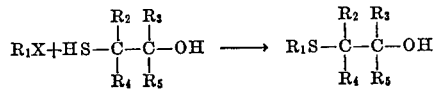

wherein X represents halogen, $R_1$ represents $C_1$–$C_4$ alkyl groups or $C_3$–$C_4$ alkenyl grops and $R_2$, $R_3$, $R_4$, and $R_5$ represent alkyl groups. Good results are attainable when $R_1$ is an alkyl or alkenyl group containing less than 4 carbon atoms. However, when $R_1$ is an alkyl or alkenyl group having more than 4 carbon atoms, the process is not effective and the cost of purification is disadvantageously high.

SUMMARY OF THE INVENTION

Accordingly, it is one object of this invention to provide a process for the continuous preparation of thioethers by using multiple tank-stirred-flow-reactors connected in series and to control the temperature and the amount of air injected in each reactor whereby recycling of the reaction solution is avoided, the reaction is smoothly conducted, and product purity is enhanced.

This and other objects of this invention, as will hereinafter become more readily apparent, can be attained by effecting the reaction of an α-olefin with a mercaptan of the formula: RSH in the presence of air as a free radical initiator in multiple tank-stirred-flow-reactors connected in series (preferably 3–6 reactors), wherein in the first reactor the reaction temperature is in the range of 60–150° C., preferably 80–100° C., and the amount of air introduced is in the range of 0.1–100 litre, preferably 50–100 litre, per 1 kg. of α-olefin reacted, and in the second and subsequent reactors, the reaction temperature is in the range of −30∼150° C., preferably 0°–80° C., and the amount of air introduced is in range of 0.1–100 litre, preferably 50–100 litre, per 1 kg. of α-olefin reacted. In addition, the reaction is run continuously in the absence of solvent.

DETAILED DESCRIPTION OF THE PREFERRED EMBODIMENTS

Figure 1:
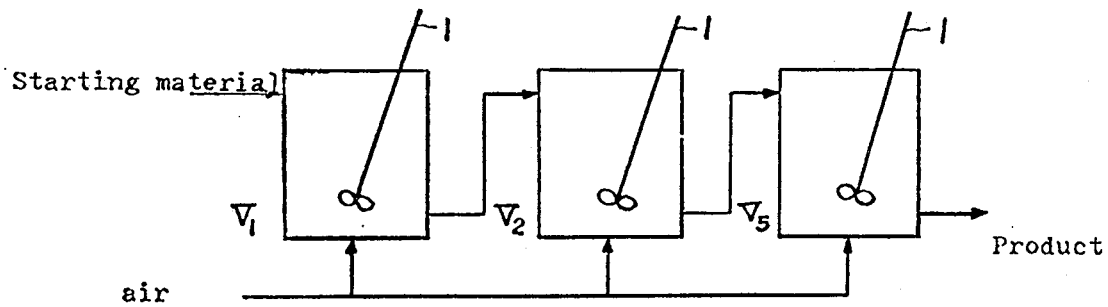
FIG. 1 is a schematic view of the reactors used in Examples 1 and 2.

The reaction of an α-olefin with a mercapto compound is an exothermic reaction yielding a relatively high quantity of heat. For example, 24 kcal./mole are released in the reaction of 1-dodecene with 2-mercaptoethanol. When a batch type reactor is used and the reaction solution is not recycled, an induction period occurs followed by a severe exothermic reaction resulting in a sudden increase in the reaction temperature. Thus, control of the reaction has been impossible and the danger of explosion or deterioration of the product was previously unavoidable.

The same disadvantages have been found in the conventional process in which the reaction solution is recycled to the reaction system. However, the severe exothermicity exhibited by the reaction can be prevented by the use of the reactor system of this invention which is a series of several tank-stirred-flow-reactors. Because the exothermicity of the reaction can be moderated, a mild, easily controlled reaction results which can be conducted at higher temperatures than would otherwise be possible.

The conversion to product sulfide for each case is shown in the following Table:

| Percent of | Example | Reference 1 | Reference 2 |
|---|---|---|---|
| Conversion at inlet of 1st reactor $V_1$ | 0 | 30.0 | 30.0 |
| Conversion at outlet of 1st reactor $V_1$ | 60.3 | 77.7 | 66.9 |
| Conversion at outlet of 2nd reactor $V_2$ | 85.0 | 88.6 | 86.2 |
| Conversion at outlet of 3rd reactor $V_3$ | 92.1 | 93.0 | 92.1 |

(Reference 3)

In a 500 ml. 4-necked flask fitted with a stirrer, a condenser and an air injecting nozzle, 84 g. (0.5 mole) of 1-dodecene was reacted with 39 g. (0.5 mole) of 2-mercaptoethanol. The reaction was conducted at 50° C. by injecting air at the rate of 0.5 litre/hr. If a portion of the reaction solution was not recycled to the reactor, an induction period of 11 minutes resulted, followed by the sudden initiation of a severe exothermic reaction raising the reaction temperature to 105° C.

The relationship between reaction period and conversion in Reference 3 is shown in the following Table:

Reaction period (11 minute induction period)    Conversion, percent
- 15 min. ........................................ 69.5
- 30 min. ........................................ 81.5
- 40 min. ........................................ 84.5
- 50 min. ........................................ 86.0
- 100 min. ....................................... 89.0
- 220 min. ....................................... 92.1

(Reference 4)

The batch process conditions of Reference 3 were duplicated, except that when more than 30% of the reaction solution was recycled to the reactor, no induction period resulted. In addition, the reaction was conducted at 105° C.

Typical oxidation products of sulfides, such as sulfoxides and sulfones, were not produced as by-products in the reaction of Example 1, Reference 1 and Reference 2. However, in the batch process of References 3 and 4, large amounts of by-products were produced providing a product of low purity.

Figure 2:
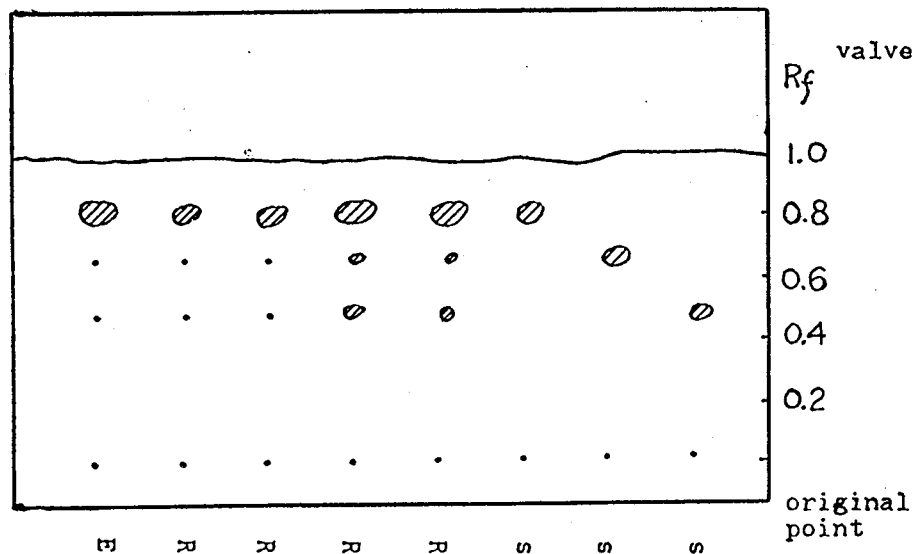
FIG. 2 is an illustration of the thin layer chromatographs of the products prepared in Example 1, References 1, 2, 3 and 4; and, FIG. 3 is an illustration of the thin layer chromatographs of the products prepared in References 5, 6, 7, 8 and 9.

The thin layer chromatograph results of the products from the reaction of Example 1, Reference 1, Reference 2, Reference 3 and Reference 4 are shown in FIG. 2. In the analysis, Kieselgel G nach Stahl was used as the silica gel, and a mixture of chloroform and methanol in a ratio of 9:1 with the addition of 5 drops of conc. $H_2SO_4$ was used as the developer.

(References 5-9)

Figure 3:
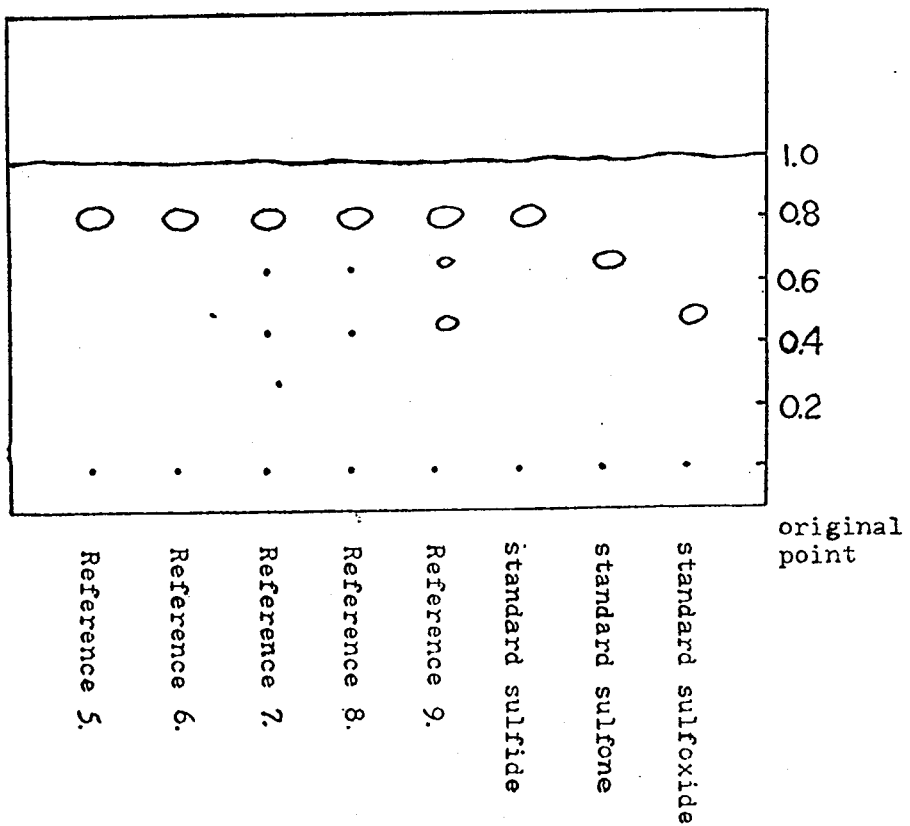

In a 500 ml. tank-stirred-flow-reactor, 1-dodecene and 2-mercaptoethanol were continuously supplied at the rates of 15.0 g./min. and 7.0 g./min., respectively. The rate of air injected was changed in each reaction. The reactions were conducted at 80° C. with the rate of air injected in each reference at 0.01 litre/hr., 0.10 litre/hr., 1.0 litre/hr., 10 litre/hr. and 50 litre/hr. The resulting products from each experiment were analyzed and the yield calculated as a function of the ratio of air injected per 1 kg. of α-olefin. The results show that when the rate of air injected was in the range of 0.1-100 litre/hr., the reaction proceeded smoothly and oxidative by-products were not found in the products as shown in FIG. 3.

When the rate of air injected was less than 0.1 litre/hr., the reaction rate was quite small and the conversion of α-olefin was too low to permit commercial production of the sulfide product.

When the rate of air injected was increased to a rate of 100 litre/hr., no substantial increase in the reaction rate or in the conversion of 1-dodecene corresponding to the increased air injection rate was found. Instead, a marked increase in the amounts of the sulfoxides and sulfone bythe detriment of product purity. The results of a thin layer chromatographic analysis of the reaction solutions of References 5-9 are shown in FIG. 3. The conditions of the analysis are the same as those of the analysis depicted in FIG. 2.

| Reference | Rate of air injected | | Conversion of 1-dodecene (percent) |
|---|---|---|---|
| | Litre/hr. of air | Rates of air injected per 1 kg. of α-olefin | |
| 5 | 0.01 | 0.17 | 6.7 |
| 6 | 0.1 | 0.56 | 20.0 |
| 7 | 1.0 | 3.03 | 36.7 |
| 8 | 10.0 | 21.6 | 51.5 |
| 9 | 50.0 | 103.0 | 54.0 |

EXAMPLE 2

The process of Example 2 was conducted in the same manner of Example, except that 1-dodecene and 2-thioglycerine were continuously supplied at the rates of 80.0 g./min. and 51.4 g./min., respectively. The temperature of reactors $V_1$–$V_3$ and the rates of air injected into each are listed as follows:

| | Temperature, °C. | Rate of air injected (litre/hr.) |
|---|---|---|
| First reactor $V_1$ | 90 | 145 |
| Second reactor $V_2$ | 55 | 95 |
| Third reactor $V_3$ | 55 | 95 |

The conversions as measured at the outlet of each reactor are as follows:

Conversion, percent
- First reactor $V_1$ ........................................ 58.8
- Second reactor $V_2$ ..................................... 84.0
- Third reactor $V_3$ ....................................... 91.4

The reaction proceeded smoothly and the reaction temperature was easily controlled. The resulting products contained 2,3-dihydroxypropyldodecylsulfide and unreacted α-olefin and α-thioglycerine. No oxidative by-products were found in the products.

Having now fully described the invention, it will be apparent to one of ordinary skill in the art that many changes and modifications can be made thereto without departing from the spirit or scope of the invention as set forth herein.

Accordingly, what is claimed and intended to be covered by Letters Patent is:

1. In a process for the continuous preparation of a thioether by reacting an α-olefin having 8-20 carbon atoms with a mercapto compound having the formula:

RSH wherein R represents mono-, di- or tri-hydroxyalkyl groups having 2-5 carbon atoms in the presence of air as a free radical initiator, the improvement which comprises using two to six tank-stirred-flow-reactors connected in series, and controlling the temperature of the first reactor to within the range of 60-150° C., at an air injection rate of 0.1-100 litre per 1 kg. of α-olefin, and controlling the temperature of each succeeding reactor to within the range of −30~150° C., at an air injection rate of 0.1-100 litre per 1 kg. of α-olefin, in the absence of a solvent.

2. The process of Claim 1, wherein the rate of air injected is 50-100 litre per 1 kg. of α-olefin in each reactor.

3. The process of Claim 1, wherein 1-dodecene is reacted with a member of the group consisting of 2-mercaptoethanol and α-thioglycerine.

A linear relationship exists between the reaction temperature and the specific reaction rate. The specific reaction rate decreases depending upon the change in the reaction temperature.

For example, in the reaction of 1-dodecene with 2-mercaptoethanol, the following relationship was found between the specific reaction rate and the reaction temperature.

$$K_{obsd} = 4.37 \times 10^{-10} \exp-(4.81/T)$$

wherein T is absolute temperature. Accordingly, the reaction rate changes depending upon the rate of increase in the reaction temperature to provide a mild reaction. In addition, control of the reaction temperature permits control of the evolution of heat from the reaction. Moreover, the mutual solubility of the olefin and the mercapto compound is increased at a rate commensurate with the increase in reaction temperature. Consequently, the initial heterogeneous system converts to a homogeneous system, resulting in a smoothly conducted reaction which is only slightly affected by the stirring rate.

In the process of this invention, $\alpha$-olefins and mercaptans containing $C_8$-$C_{20}$ and $C_2$-$C_5$ carbon atoms, respectively, are used. Other olefinic and mercaptans containing greater or lesser numbers of carbon atoms indicated cannot be used for the process of this invention, because the boiling points and solidifying points of these olefins and mercaptans cause them to be unsuitable for use in the reactors of this invention. In addition, the sulfides resulting from these olefins and mercaptans are not suitable for certain important applications. The mercapto compounds used herein, have the formula: RSH, wherein R represents mono-, di-, or tri-hydroxyalkyl groups having 2–5 carbon atoms.

The reaction system used in the process of this invention consists of multiple-tank-stirred-flow-reactors connected in series. If the reaction were to be conducted using only one reactor, a large reactor would be required in order to control the increase in reaction temperature caused by the exothermic reaction, control of the reaction would be difficult, and the reaction period would be prolonged. Accordingly, it is necessary to use at least 2 reactors, and it is especially preferable to use 3–6 reactors in view of the cost of the process.

The tank-stirred-flow-reactors used herein is a tank having at least one inlet for the reactants, an air inlet, and an outlet for discharging reaction products. The tank is provided with suitable means for heating and cooling and suitable means for stirring to provide complete mixing. It is preferable that the inlet(s) for the reactants be separated from the outlet for the reaction products as far as possible. It is also preferable that an air opening in the bottom of the tank be provided, with a glass filter to disperse the air.

The reaction temperature is maintained in the range of 60°–150° C., preferably 80°–100° C., in the first reactor, and in the range of −30°~150° C., preferably 0°–80° C., in the second and the following reactors. When the reaction temperature is lower than said range, the specific reaction rate becomes extremely slow so that the advantages of the continuous system will not be realized. Control of the reaction temperature in the first reactor will be difficult if the reaction temperature is outside of this range.

The amount of air introduced into the reactor is in the range of 0.1–100 litre, preferably 50–100 litre, per 1 kg. of $\alpha$-olefin reacted. When the amount of air injected is less than the indicated range, the reaction velocity is quite slow, while, when the amount of air injected is greater than the indicated range, an increase in the reaction rate is not realized and a large amount of by-product is produced.

In accordance with this invention, the following advantages are provided:

(i) Recycling of the reaction product is not required so that the volume of each reactor can be small.

(ii) Reactions of a homogeneous consistency are conducted in the reactors.

(iii) An induction period for the reaction is avoided and a severe exothermic radical addition reaction can be prevented to provide a mild reaction. Accordingly, no by-products are produced and the purity of the reaction product is high.

(iv) Control of the reaction temperature is easy.

(v) The resulting sulfides of this invention are used as raw materials or intermediates in the synthesis of materials useful as detergency builders of heavy duty detergents, foam boosters of light duty detergents, scum dispersing agents for soap, foaming and viscosity agents for shampoos, anti-oxidants for plastics, anti-corrosion agents for metals, softening agents for fibers, penetrants, fungicides, and milding agents for skin.

Having now generally described the invention, a further understanding can be obtained by reference to the following specific Examples which are provided herein for purposes of illustration only and are not intended to be construed as limiting in any manner unless otherwise indicated.

EXAMPLE 1

A series of three tank-stirred-flow-reactors each having a 10 litre volume are shown in FIG. 1, wherein $V_1$, $V_2$, $V_3$, respectively, represent a reactor, and 1 represents a stirrer, were used. 1-Dodecene and 2-mercaptoethanol were continuously supplied to the reactor $V_1$ at the rates of 80 g./min. and 37.1 g./min., respectively, via a pump to achieve the desired ratio of reactants in the reaction mixture. As the reaction proceeded, the solution was pumped to reactors $V_2$ and $V_3$. Air was continuously injected at the gage pressure of 0.6 kg./cm.$^2$ through glass filters as fine bubbles in the bottom of each reactor.

The reaction temperature and the amount of air in each reactor were as follows:

|  | Temperature, °C. | Rate of air injected (litre/hr.) |
| --- | --- | --- |
| First reactor $V_1$ | 80 | 150 |
| Second reactor $V_2$ | 55 | 100 |
| Third reactor $V_3$ | 55 | 100 |

The conversion of reactants to product was determined at the outlet of each reactor by measuring for residual mercaptan using a 0.1 N copper butylphthalate solution as follows:

Conversion, percent
First reactor $V_1$ ------------------------------ 60.3
Second reactor $V_2$ ---------------------------- 85.0
Third reactor $V_3$ ----------------------------- 92.1

The purity of the resulting sulfide was 99%.

(Reference 1)

The process of Example 1 was repeated, except that a uniform reaction temperature of 50° C. was maintained in reactors $V_1$, $V_2$, and $V_3$, and 33% of the reaction solution was recycled. The temperature of reactor $V_1$ fluctuated so that it was difficult to maintain the desired temperature.

(Reference 2)

The process of Example 1 was repeated, except that 33% of the reaction solution was recycled and the volume of each reactor was 13 litres instead of the 10 litre sized reactors used in Example 1. The reaction proceeded smoothly and temperature fluctuations were readily controlled. The yield of sulfide product was the same as in Example 1.

4. The process of Claim 1, wherein 3–6 tank-stirred-flow-reactors are used in series and air is injected into the bottom of each reactor while the reactants are supplied from an upper inlet in each reactor and the reaction products are withdrawn from each reactor at a lower outlet.

References Cited
FOREIGN PATENTS
1,517,363   3/1967   France ---------- 260—609 R ELBERT L. ROBERTS, Primary Examiner
D. R. PHILLIPS, Assistant Examiner